United States Patent Office 3,409,461
Patented Nov. 5, 1968

3,409,461
PROCESS FOR THE MANUFACTURE OF AN ENCAPSULATED ISOCYANATE
Walther Mehlo, Wiesbaden-Biebrich, and Rudolf Titzmann and Rudolf Zinsmeister, Bobingen, Germany, assignors to Kalle Aktiengesellschaft, Wiesbaden-Biebrich, Germany
No Drawing. Filed Nov. 22, 1963, Ser. No. 325,782
Claims priority, application Germany, Nov. 24, 1962, K 48,293
12 Claims. (Cl. 117—100)

ABSTRACT OF THE DISCLOSURE

This invention relates to encapsulated isocyanates and to a process for the manufacture thereof, the encapsulated material including an isocyanate core confined in an envelope of a protective substance which is inert, at least, to isocyanates and to aqueous media. The protective substance, which envelopes the fine isocyanate particles in the form of a more or less continuous film, should melt or soften only at temperatures above 50° C. so that the encapsulated isocyanate can then migrate to the surface of the protective substance either directly or by diasolytic diffusion, which may then be followed by the desired chemical reaction, for example, with hydrogen-active compounds, such as alcohols, enols, acids, amines or amides.

---

Isocyanates are highly reactive with hydrogen-active compounds and can, therefore, be used for many purposes. However, in some cases they cannot be utilized in industry, or are utilized only with difficulty, because they are unsuitable for use as such in an aqueous medium and are physiologically not without objection, so that in handling them special safety precautions must be observed.

It is also desirable for many purposes for the isocyanate to become reactive only when a certain reaction stage has been reached. Accordingly, to solve this problem it has already been proposed to block the isocyanates chemically with another suitable hydrogen-active compound that can subsequently be thermally split-off. Such hydrogen-active compounds are, for example, phenols, enols and imides. These so-called "masked isocyanates" or "isocyanate donors" are stable for a prolonged period in the aqueous reaction medium in which they may be dispersed and do not attain the desired reactivity with other compounds containing active hydrogen atoms until the water has been distilled off and heating at an elevated temperature has been effected for a further period, at which temperature the masking component is split-off. A disadvantage of this procedure is the additional presence, after the splitting, of the masking component which is not completely inert. This is undesirable, apart from a possible physiological objection, because in most cases this component has an adverse effect on the intended use of the isocyanate.

The invention also provides a process for the manufacture of the afore-mentioned encapsulated isocyanates, wherein the isocyanate is the core material which is mechanically enveloped in a protective substance, the latter being chemically inert at least to the isocyanate and aqueous media, the envelopes being produced by spray-drying a solution of the protective substance in an organic solvent in which the isocyanate is dispersed.

Thus, the present process differs from the known art in that the isocyanate in finely dispersed form is mechanically covered with a protective substance which is chemically inert to both the isocyanate and the aqueous medium containing the hydrogen-active compounds.

The advantages of the encapsulated isocyanates manufactured by the present process are their easy, safe handling properties and ease of measuring out. Moreover, depending on the protective substance selected, the temperature at which the isocyanate is to be made available can be widely varied. Furthermore, the isocyanate or the protective substance can be admixed with additives which are advantageous in the subsequent reaction of the isocyanate with the hydrogen-active compound, such as catalysts. The encapsulation of the isocyanate according to this invention is easy to perform continuously with a substantially 100% yield. When one of the new encapsulated isocyanates is used in practice, no masking component is liberated the presence of which may be objectionable both from a chemical and a physiological standpoint. No discharge devices for unwanted material are needed.

Generally speaking, the encapsulation of isocyanates is accomplished according to the invention by finely dispersing the isocyanate in a solution of the protective substance in an organic solvent, the solvent being one in which the isocyanate is sparingly soluble, and the dispersion is then atomized under pressure by means of a nozzle. The solvent evaporates under the action of heat and the resulting fine, completely dry, free-flowing powder, comprising the isocyanate as the core material enveloped by the protective substance, is deposited with the aid of a stream of air in a cyclone, or electrostatically.

The protective substance used in the present process must satisfy the following requirements: It must be chemically inert to the isocyanate, i.e., it should be substantially free from groups containing active hydrogen atoms, it must be stable in an aqueous neutral, acidic or alkaline medium and it must be insoluble or sparingly soluble therein. By "stable" as used in this context is meant inert to reaction at a temperature below 100° C. for a period of at least 1 hour, preferably at least 8 hours. The protective substance must render the isocyanate available to other compounds, with which reaction is desired, at an elevated temperature, i.e., it must melt or soften at a temperature above about 50° C., or it must possess at such temperature an increased solvent powder for the encapsulated isocyanate, to enable the isocyanate to diffuse therethrough diasolytically; it also must be soluble in a solvent in which the isocyanate is sparingly soluble. Further, it is desirable that the solution of the protective substance in the organic solvent should not be too viscous, so that the solution can be spray-dried without difficulty. The surface of the protective substance must not be tacky at room temperature or at slightly elevated temperatures in order that free-flowing powders are obtained.

Exemplary of substances which satisfy the above conditions and can be used in the present process are: synthetic polymeric vinyl and divinyl compounds and derivatives thereof, for example polyethylene, chlorinated polyethylene, polypropylene, polyvinyl chloride, polyvinyl esters, polyvinyl ethers, and polystyrene; copolymers of the monomers on which the polymers are based, either with one another or with proportions of other substances that satisfy the above conditions; copolymers of the polymers; synthetic polycondensates, for example polyesters, tertiary polyamides, polyhydroxyalkylenes or copolymers, mixtures of various polycondensates, and synthetic polyadducts, such as polyurethanes; partially synthetic and natural polymers and conversion products thereof, for example cellulose triacetate, chlorinated rubber and the like; low-molecular, synthetic, partly synthetic and natural organic compounds, for example synthetic waxes or paraffin waxes, and also inorganic materials, such as sulfur.

With the solutions of the protective substances may be admixed plasticizers, such as chlorinated aromatic hydrocarbons and/or non-ionic, cationic or anionic wetting agents, dyestuffs, optical brighteners and catalysts which accelerate the subsequent reaction between the isocyanate and the hydrogen-active compound.

The shape of the final product including the enveloping substance may vary widely; it may merely assume the same shape as the core material or the enveloping substance may produce a uniform spherical shape of the product particles.

The shape of the core material is not important; it may be spherical or may take any other compact shape. The core material may be solid or liquid, crystalline or amorphous, and it may be present in the form of separate particles or in the form of agglomerates.

The diameter of the core may be $100\mu$ or more, but is preferably not more than $50\mu$. Particularly good results are obtained in the encapsulation when the particle size of the core material ranges from about 0.1 to $20\mu$. The thickness of the envelope will in general depend upon the nature thereof, i.e., above all on the permeability thereof to water or to the encapsulated isocyanate. In general, good results are obtained by the present process when the thickness of the envelope is within the range of 1 to $5\mu$, although a thicker or thinner envelope may also produce good results.

The weight ratio of core to envelope may range from about 1:10 to 10:1, preferably from 1:2 to 4:1.

The present process is further described below in a general example of the manufacture of an encapsulated isocyanate with reference to:

(1) Selection of the components of the dispersion, taking into consideration the respective solubilities of the core material and the protective substance.
(2) Manufacture of the dispersion.
(3) Atomization of the dispersion.
(4) Drying.
(5) Deposition.

The selection of the components of the dispersion should in general be made in view of the following:

(a) The solvent for the protective substance, and
(b) The substances (i.e., core, protective substance, and additives) dissolved or dispersed in it.

Preferred solvents for the protective substance are: organic solvents in which the isocyanate is at most sparingly soluble and which do not react chemically with the isocyanate, for example straight-chain or branched-chain aliphatic hydrocarbons, for example hexane, isohexane, or octane or saturated or unsaturated or cyclic hydrocarbons with 5 or 6 cyclic members, for example cyclohexane, aromatic hydrocarbons, for example benzene, toluene, and xylene; or halogenated hydrocarbons, for example carbon tetrachloride, trichlorotrifluoroethane; ethers, for example glycol dimethyl ether or esters of monohydric or polyhydric alcohols with monobasic or polybasic acids, for example ethyl or methyl acetate; ketones, for example acetone, and aliphatic compounds containing nitrogen, for example dimethyl formamide, acetonitrile; and aliphatic or aromatic heterocyclic compounds, for example dioxane and thiophene.

The boiling point of the solvent may vary within wide limits. In general, it should be between $-50°$ C. and $+200°$ C., preferably between $+30°$ C., and $+100°$ C.

The material to be atomized comprises the above-defined core material and protective substance and, if desired, additives. Generally, any substance can be atomized that can be disolved and recovered from a solution thereof in the form of a solid powder. The particles of the isocyanate dispersed in the organic solution of the protective substance should be as small as possible. The diameter of the particles may average up to $100\mu$, preferably 0.1 to $10\mu$.

For the manufacture of the dispersion, the concentration of the solution of the protective substance in the organic solvent defined above should be selected so that the viscosity does not become excessive and the dispersion is easy to atomize; in general, the viscosity should not exceed 50 centipoises. Good results are obtained with a viscosity of up to 15 centipoises, and more particularly of 1 to 5 centipoises. The limits of the concentration corresponding to the viscosity may vary widely depending upon the different viscosities of the solutions of the protective substances in different solvents. In general, good results are obtained when the concentration of the protective substance in the solution ranges from 0.1 to 20% by weight, preferably from 0.5 to 5%. If in some cases a low solubility in the solvent can not be avoided, then the concentration of the isocyanate dissolved in the organic solvent should not exceed a very minor fraction of the total amount of dispersed isocyanate. In the case of substances of a relatively low solubility, this can be achieved by suitably cooling the solution or dispersion. The temperature of the dispersion during passage from a storage container to the spray nozzle depends on the solubility of the isocyanate in the solvent for the protective substance. It may vary from $-50°$ C. to $+50°$ C., preferably from $-25°$ C. to $+25°$ C. The dissolved fraction of the isocyanate should be very small, preferably below a few percent.

The dispersion should remain stable until atomization thereof has been completed. The quantity of atomized solution per time unit may vary with the number of nozzles, pressure and throughput. During the atomizing time only a minimum of sedimentation or creaming of the dispersion is acceptable. This can be ensured by stirring the dispersion or by circulation by pumping, or by adjusting the specific gravity of the solution so that it is similar to that of the isocyanate. The solvents may be suitably adapted to this requirement, i.e. the kind or proportions of solvents present in the mixture may be varied.

The preparation of the actual dispersion may follow conventional practice and consist, for example, in incorporating the components at various temperatures. The solution may be atomized through one or more simple nozzles or twin nozzles, and so-called mixer nozzles may also be used. It should further be ensured that these nozzles produce a definite degree of atomization. Normally, the process can be performed with simple nozzles under a pressure of 10 to 50 kp./cm.$^2$, and twin nozzles are advantageously applied using pressures of between 0.5 and 10 kp./cm.$^2$, although in some cases a lower or higher pressure may be of advantage. The size of the bore of the nozzle, the pressure and the viscosity have a certain influence on the average particle size and on the throughput. In general, it is observed that with a smaller bore under a higher pressure, a smaller diameter of the particles of the material atomized results. Especially good results are obtained by using the separating gas current spray drying method disclosed in copending application Ser. No. 315,291 filed Oct. 10, 1963.

The drying, i.e. the freeing of the dissolved and dispersed solid material from solvent and dispersing agent, can be performed in a variety of ways, depending, however, upon the following conditions: the heat output of the source of heat, for example infra-red heaters, the amount of carrier gas supplied (for example air), the throughput rate, and the physical constants of the solution components, such as their boiling points and heat of evaporation. With regard to the heat supply, it must be ensured that it is sufficient to evaporate the solvent or dispersing agent completely inside the heating zone.

The amount of carrier gas used must be sufficient to transport and then deposit the dry material. Furthermore, it must be sufficient to prevent any renewed effect of the solvent vapors on the dry material, for example by a re-swelling of the protective substance.

The throughput rate, or the amount of final product formed per hour, depends upon the nozzles selected, the atomizing pressure and the number of the nozzles used. In general, good results are obtained at a throughput rate corresponding to a yield of 100 to 1000 grams of dry material per hour per nozzle, although even larger yields of a final product of good quality are possible.

An apparatus that is especially suitable for drying the atomized particles is the separating gas current spray drying apparatus described in the copending application, supra. Compared with the conventional warm air driers, this apparatus offers the advantage that the solvent vapors, which are capable of affecting a lyoscopic envelope, are removed from the dry product substantially completely. If the envelope is not lyoscopic, other conventional driers, such as warm air driers, will do equally well.

The final product obtained by the present process is a completely dry, free-flowing powder of the kind defined above; the yield is substantially quantitative. The deposition can be carried out in known manner, for example in a cyclone. The encapsulated isocyanates may be used in a variety of reactions; they are suitable, for example, as components for improving the adhesion of shaped polyester products (such as filaments, fabrics, threads, and films or the like) to rubber elastomers.

The following specific examples further illustrate the invention:

Example 1

50 grams of very finely ground naphthylene-1,5-diisocyanate of average particle size 5$\mu$ (particles varying from 1 to 10$\mu$) were dispersed in 4 kg. of a solution in carbon tetrachloride, cooled to 6° C., of 1.25% by weight of polystyrene and 1.25% by weight of a chlorinated diphenyl as a plasticizer. The suspension was atomized in a separating gas current spray-drying apparatus as referred to above with the use of a "Kreisl" atomizing nozzle, diameter of bore: 0.35 mm., under a nitrogen pressure of 30 kp./cm.$^2$ and using 9 infra-red radiators having a total heat output of 4 kw. The carrier gas for the atomized material was a current of air having a flow rate of 450 m.$^3$ per hour. The atomized material was deposited in a cyclone, while the solvent vapors were discharged through an exhauster. After spraying for 15 minutes, there were obtained 113 grams of encapsulated naphthylene-1,5-diisocyanate. Yield: 75%. Ratio core material to protective substance=1:2, by weight.

The completely dry, free-flowing powder consisted of an agglomerate of isocyanate particles which was well enveloped by the protective mixture. Average particle size: 30$\mu$ (measured under a microscope with an ocular scale).

Example 2

The process described in Example 1 was repeated with the same starting materials in the same amounts, but there was also added about 0.03% by weight of a non-ionic wetting agent consisting of a hydroxy-ethylated alkylphenol. The particles were spherical, practically unagglomerated, and the isocyanate was completely encapsulated in the protective mixture. The average particle size was 5$\mu$ (range of particle sizes: 1 to 15$\mu$).

Example 3

(a) 50 grams of naphthylene-1,5-diisocyanate were suspended as described in Example 1 in 4 kg. of a solution (containing a hydroxyethylated alkylphenol) of 1.25% by weight of polystyrene in carbon tetrachloride, and then spray-dried. After 14 minutes, 80 grams of a dry, free-flowing powder were obtained. Yield: 80%. Ratio core material to protective substance=1:1, by weight.

The naphthylene-1,5-diisocyanate in the form of agglomerates was also in this case enveloped by polystyrene practically completely, with the production of substantially spherical particles. The average particle size was 20$\mu$ (range of particle sizes: 1 to 40$\mu$).

(b) to (e). As shown in the following table, 60 to 100 grams of naphthylene-1,5-diisocyanate were suspended in 4 kg. of a solution of polystyrene in carbon tetrachloride (containing a hydroxyethylated alkylphenol) of varying concentration (1.5 to 2.5% by weight) and then spray-dried. The ratio of core material to envelope substance was 1:1, by weight.

It was observed that a certain concentration limit of the polystyrene in carbon tetrachloride (varying from 2.5 to 5% by weight) should not be exceeded. The viscosity of the solution, which increases with the concentration, causes an increase in the particle diameter. On the other hand, it was observed that as the concentration of the polystyrene solution decreased, the degree of fineness of the resulting powder was correspondingly increased. Thus, depending upon the concentration selected, there may be obtained products having a desired, different average particle size (see table).

| Example | Quantity of naphthylene-1,5-diisocyanate, in grams | Concentration of polystyrene solution, in percent by weight | Particle size | |
|---|---|---|---|---|
| | | | Average, $\mu$ | Range, $\mu$ |
| a | 50 | 1.25 | 20 | 2–50 |
| b | 60 | 1.5 | 25 | 5–75 |
| c | 70 | 1.75 | 30 | 5–75 |
| d | 80 | 2.0 | 40 | 10–90 |
| e | 100 | 2.5 | 75 | 10–120 |

Example 4

112.5 grams of very finely ground naphthylene-1,5-diisocyanate were suspended in 7.5 kg. of a 1.5% solution, cooled to 6° C., of polystyrene in carbon tetrachloride, to which a small amount of a hydroxyethylated alkylphenol had been added. Spray-drying was performed with the use of three "Kreisl" atomizing nozzles which were located at such an angle with respect to one another that the spray cones therefrom did not impinge on one another. The atomization progressed smoothly and without difficulty. Infra-red radiators were used to give a heat output of 7 kw., and the air current used for drying was supplied at a rate of 450 m.$^3$ per hour. After 10 to 12 minutes, 210 grams of dry powder were obtained. Yield 93%. Ratio of core material to protective substance=1:1, by weight. The properties of the particles were as described under 3(b) above. When the process was performed practically continuously, a yield of 900 grams of dry substance per hour was obtained.

Example 5

225 grams of naphthylene-1,5-diisocyanate were suspended in 7.5 kg. of a 1.5% of polystyrene solution, as described in Example 4, and then spray-dried. Yield: 270 grams (=88%) of dry, free-flowing powder. Ratio of core material to protective substance=2:1, by weight. Agglomerates enveloped by polystyrene had an average particle size of 30$\mu$ (range 1 to 50$\mu$) and a shape slightly deviating from spherical.

Example 6

225 grams of naphthylene-1,5-diisocyanate were suspended in 7.5 kg. of a polystyrene solution of 0.75% by weight concentration, described in Example 4, and then spray-dried. Yield: 240 grams (=85%) of dry, free-flowing powder. Ratio of core material to protective substance=4:1, by weight. Agglomerates, which in this case were not entirely uniformly enveloped by polystyrene, had an average particle size of 30$\mu$ (range 1 to 50$\mu$) and a shape that deviated considerably from spherical.

Examples 7 to 14

As shown in the following table, additional protective substances were used for encapsulating naphthylene-1,5-diisocyanate:

75 grams of very finely ground naphthylene-1,5-diisocyanate were suspended in 7.5 kg. of a 1% by weight solution, cooled to 6° C., of one of the following protective substances in carbon tetrachloride (in which a trace of a hydroxyethylated alkylphenol had been dissolved), and then spray-dried as described in Example 4. The use of any one of the protective substances listed in the following table produced a dry, free-flowing powder, the ratio of core material to protective substance in each case being 1:1 by weight.

The particle size of the resulting predominantly spherical particles, being agglomerates enveloped by the protective substance, depended upon the viscosity of the solution.

| | Protective substance | Yield, Percent | Grain size | |
|---|---|---|---|---|
| | | | Average μ | Range μ |
| 7 | Chlorinated rubber of low viscosity | 80 | 8 | 1-20 |
| 8 | Chlorinated rubber of medium viscosity | 78 | 10 | 1-25 |
| 9 | Chlorinated rubber of high viscosity | 80 | 20 | 2-50 |
| 10 | Polyvinyl butyl ether | 80 | 10 | 5-15 |
| 11 | Polycondensate of substituted phenol, xylene and formaldehyde | 80 | 10 | 5-15 |
| 12 | Chloropolypropylene | 80 | 20 | 1-50 |
| 13 | Chloropolyethylene | 80 | 15 | 1-40 |
| 14 | Solid chloroparaffin | 80 | 10 | 1-25 |

It will be obvious to those skilled in the art that many modifications may be made within the scope of the present invention without departing from the spirit thereof, and the invention includes all such modifications.

We claim:
1. A process for producing an encapsulated isocyanate which comprises spray-drying a dispersion of a solid organic isocyanate in an organic solvent having a protective material dissolved therein, the protective material being chemically inert to the isocyanate and to aqueous media.
2. A process according to claim 1 in which the protective material is stable to aqueous media for at least one hour.
3. A process according to claim 1 in which the protective material has a melting point above 50° C.
4. A process according to claim 1 in which the dispersion includes an additive selected from the group consisting of plasticizers, wetting agents, dyestuffs optical brighteners, and catalysts.
5. A process according to claim 1 in which the isocyanate is naphthylene-1,5-diisocyanate.
6. A process according to claim 1 in which the organic solvent is carbon tetrachloride.
7. A process according to claim 1 in which the protective material is polystyrene.
8. A process according to claim 1 in which the protective material is chlorinated rubber.
9. A process according to claim 1 in which the protective material is polyvinyl butyl ether.
10. A process according to claim 1 in which the protective material is a polycondensate of a phenol, xylene and formaldehyde.
11. A process according to claim 1 in which the protective material is a chloropolyolefin.
12. A process according to claim 1 in which the protective material is a solid chloroparaffin.

References Cited
UNITED STATES PATENTS

| | | | |
|---|---|---|---|
| 2,702,773 | 2/1955 | Penn et al. | 161—190 |
| 2,929,737 | 3/1960 | Tischbein | 116—76 |
| 3,161,602 | 12/1954 | Herbig et al. | 252—316 |
| 2,450,503 | 10/1948 | Drummond | 117—62.1 |
| 2,684,305 | 7/1954 | Quinlivan | 117—62.1 |
| 2,987,496 | 6/1961 | Simpson | 117—100 |
| 3,016,308 | 1/1962 | Macaulay | 117—38.7 |
| 3,138,478 | 6/1964 | Hedman et al. | 117—106 X |
| 3,179,637 | 4/1965 | Brodt et al. | 117—100 X |
| 3,190,850 | 6/1965 | Burke | 117—100 |
| 3,198,647 | 8/1965 | Kress | 106—308 |
| 3,202,533 | 8/1965 | Sachsel et al. | 117—100 X |

WILLIAM D. MARTIN, *Primary Examiner.*

T. G. DAVIS, *Assistant Examiner.*